(12) United States Patent
Brewer et al.

(10) Patent No.: US 6,621,766 B2
(45) Date of Patent: Sep. 16, 2003

(54) FLEXIBLE TIMEPIECE IN MULTIPLE ENVIRONMENTS

(75) Inventors: Donald R. Brewer, Dallas, TX (US); Chan Chin Pang John, Hong Kong (HK); Jeffrey Keith Bruneau, Plano, TX (US)

(73) Assignee: Fossil, Inc., Richardson, TX (US)

( * ) Notice: Subject to any disclaimer, the term of this patent is extended or adjusted under 35 U.S.C. 154(b) by 0 days.

(21) Appl. No.: 09/920,507

(22) Filed: Aug. 1, 2001

(65) Prior Publication Data

US 2003/0026171 A1 Feb. 6, 2003

(51) Int. Cl.⁷ .................. G04C 19/00; G04B 19/30; G04B 37/00
(52) U.S. Cl. .............. 368/82; 368/10; 368/84; 368/226; 368/227; 368/242; 368/276; 368/281; 368/282
(58) Field of Search ............... 368/276, 281–282, 368/10, 84, 242, 82, 226–227

(56) References Cited

U.S. PATENT DOCUMENTS

| | | | | |
|---|---|---|---|---|
| 3,971,206 A | * | 7/1976 | Martino | 368/282 |
| 4,130,987 A | * | 12/1978 | Schickedanz | 368/29 |
| 4,575,833 A | * | 3/1986 | Bakhtiari | 368/282 |
| 5,418,760 A | * | 5/1995 | Kawashima et al. | 368/69 |
| 5,515,247 A | * | 5/1996 | Cheung | 362/84 |
| 5,808,783 A | | 9/1998 | Crowley | 359/296 |
| 6,118,426 A | | 9/2000 | Albert et al. | 345/107 |
| 6,185,160 B1 | * | 2/2001 | Tsuda | 368/67 |
| 6,216,490 B1 | * | 4/2001 | Radley-Smith | 63/3 |

FOREIGN PATENT DOCUMENTS

FR 26 78812 * 1/1993 ............ 368/10

* cited by examiner

*Primary Examiner*—David Martin
*Assistant Examiner*—Michael L. Lindinger
(74) *Attorney, Agent, or Firm*—David W. Carstens; Carstens Yee & Cahoon LLP

(57) ABSTRACT

An electrophorectic display is used in a watch, allowing for a dynamic range of new shapes and environments of use. The present invention addresses many of the shortcomings of the prior art watch technology. Specifically, a watch that embodies the present invention is uses addressable reflective display technology such as electronic ink or gyricons. This allows a watch display that features some flexibility. Further, the display can be shaped into a variety of interesting and novel designs that cannot be accomplished using prior art displays. The flexibility of the display also allows for the novel placement of the watch display. For example, the display can be placed onto a shoe, allowing a runner to see the time without having to move his arm into a viewing position. The watch display could also be placed into a wallet, or on a purse or belt. Any flexible garment or accessory could now incorporate a watch. The use of an electrophoretic display is also aided by new sealing technologies that allow the display to be incorporated into high wear, high flex items.

56 Claims, 10 Drawing Sheets

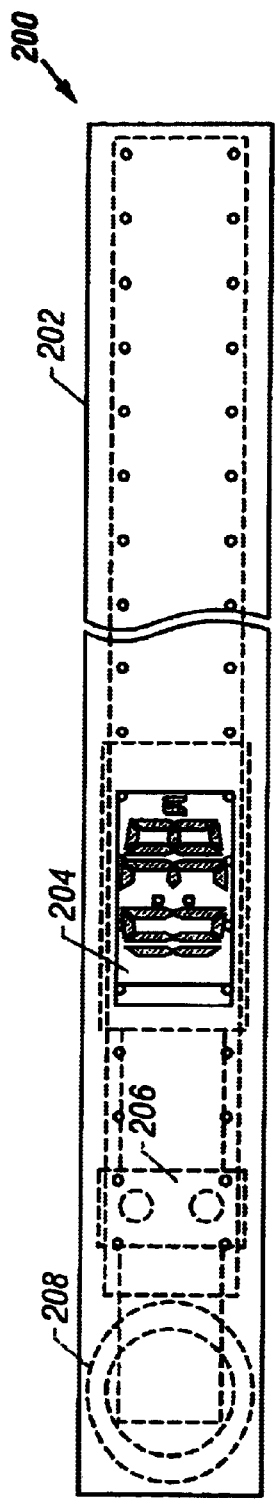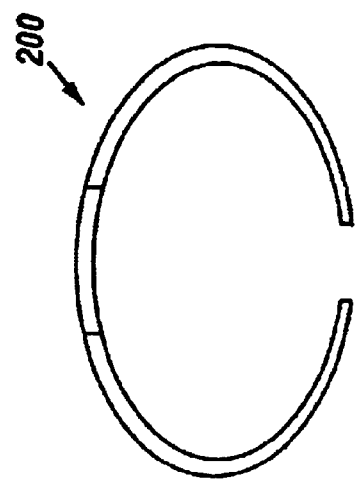

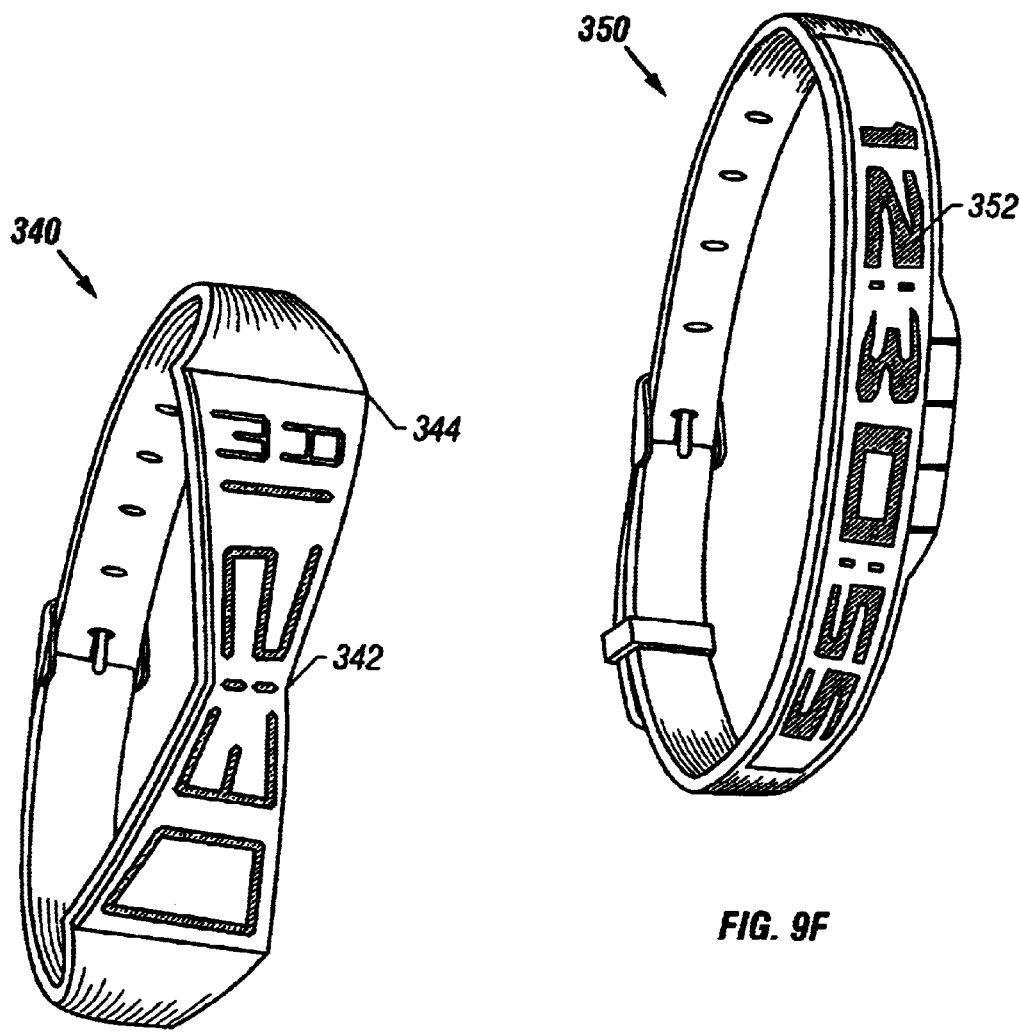
FIG. 9E
FIG. 9F
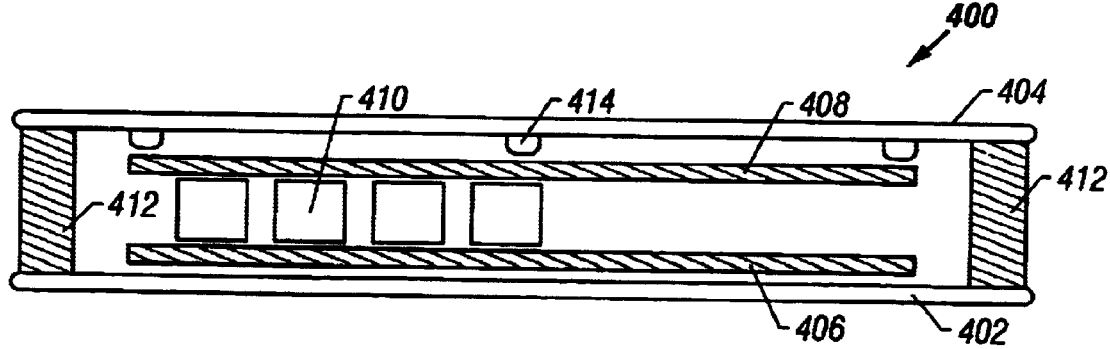
FIG. 10

FLEXIBLE TIMEPIECE IN MULTIPLE ENVIRONMENTS

BACKGROUND OF THE INVENTION

1. Technical Field of the Invention

The present invention relates generally to a timepiece having a reflective and flexible display, and specifically to the mechanical solutions involved in implementing such a watch and to the multiple environments in which such a watch could be implemented.

2. Description of Prior Art

Watches come in a variety of shapes and sizes. The watch display is usually either mechanical with at least two hands that sweep around a marked dial or a liquid crystal display. In either case, one common constraint for prior art watches is the rigidity of the display. It is common for the display to have a metal casing and either a glass or hard plastic crystal.

FIG. 1A illustrates a standard prior art watch 10. The watch has a thick case 12 that contains the time keeping mechanism. The case can be anywhere from a few millimeters thick to well over a centimeter. The case can be made of metal or a hard plastic; but in either case, it must be rigid to protect the time keeping mechanism. Likewise, FIG. 1B illustrates a generic digital watch 20. The watch also has a display. In many instances the display is a liquid crystal display (LCD) 22. An LCD display provides several advantages including generally low power requirements. The LCD is a reflective display. In other words, selected segments of the LCD display are biased to either a black or a gray state. The gray segments are approximately 15–25% reflective; so approximately one sixth to one quarter of the incident light produces either light or dark segments in the shape of numbers or letters. Ambient or supplemental light reflects off of the segments and the user can determine the time or date. LCD displays must also incorporate a hard display cover A need exists for a flexible display for watches. A flexible display would allow for a number of significant advancements in the design and mechanical implementation of watches. Despite much effort directed to developing highly flexible, reflective display media, there are relatively few examples of displays formed on semi-flexible substrates, and these examples have found only moderate success. For example, plastic-based liquid crystal displays, including twisted nematic (TN), supertwisted nematic (STN), polymer dispersed liquid crystal (PDLC), and bistable cholesteric liquid crystals have been developed. Nevertheless, problems remain with liquid crystal alignment in TN and STN displays, cholesteric displays are sensitive to changes in their cell gap, and local stress can cause changes in the scattering or absorbance of PDLC and cholesteric films. As such, only moderate flexibility can be achieved with these displays.

Emissive electroluminescent films and organic light emitting diode films can be deposited on flexible substrates to create flexible displays. However, these devices require continuous power consumption for operation, and thus are not practical for many applications.

The concept of electronic ink, or e-ink, is disclosed in U.S. Pat. No. 6,118,426, owned by E-Ink Corp. of Cambridge Mass. An encapsulated electrophoretic display can be constructed so that the optical state of the display is stable for some length of time. When the display has two states that are stable in this manner, the display is said to be bistable. If more than two states of the display are stable, then the display can be said to be multistable. The term bistable indicates a display in which any optical state remains fixed once the addressing voltage is removed. The definition of a bistable state depends on the application for the display. A slowly-decaying optical state can be effectively bistable if the optical state is substantially unchanged over the required viewing time. For example, in a display that is updated every few minutes, a display image which is stable for hours or days is effectively bistable for that application. The term bistable also indicates a display with an optical state sufficiently long-lived as to be effectively bistable for the application in mind. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may comprise capsules dispersed in a binder. The capsules may be of any size or shape. The capsules may, for example, be spherical and may have diameters in the millimeter range or the micron range, but is preferably from ten to a few hundred microns. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further comprise a suspending fluid in which the particles are dispersed.

Referring to FIG. 2A, a display 30 is created by printing a first conductive coating 32 on a substrate 34, printing an electronic ink 36 on the first conductive coating 32, and printing a second conductive coating 38 on the electronic ink 36. Conductive coatings 32, 38 may be Indium Tin Oxide (ITO) or some other suitable conductive material. The conductive layers 32, 38 may be applied from a vaporous phase, by electrolytic reaction, or deposition from a dispersed state such as spray droplets or dispersions in liquids. Conductive coatings 32, 38 do not need to be the same conductive material. For example, the substrate 34 is a polyester sheet having a thickness of about 4 mil, and the first conductive coating 32 is a transparent conductive coating such as ITO or a transparent polyaniline. The second conductive coating 38 may be an opaque conductive coating, such as a patterned graphite layer. Alternatively, the second conductive coating 38 can be polymeric. The polymer can be intrinsically conductive or can be a polymer carrier with a metal conductor such as a silver-doped polyester or a silver-doped vinyl resin. Conductive polymers suitable for use as the second electrode include, for example, polyaniline, polypyrole, polythiophene, polyphenylenevinylene, and their derivatives. These organic materials can be colloidally dispersed or dissolved in a suitable solvent before coating. Of course, for the pixel orientation to be visible, it is preferable that the second conductive coating 38 be transparent.

The display 30 can also be created by printing a first conductive coating 32 on a first substrate 34, printing an electronic ink 36 on the first conductive coating 32, printing a second conductive coating 38 on a second substrate 34' (not shown), and configuring the substrates 34, 34' such that the second conductive coating 38 is in electrical communication with the electronic ink 36.

The electronic ink 36 comprises a plurality of capsules. The capsules, for example, may have an average diameter on the order of about 100 microns. Capsules this small allow significant bending of the display substrate without permanent deformation or rupture of the capsules themselves. The optical appearance of the encapsulated medium itself is more or less unaffected by the curvature of these capsules. FIG. 2B illustrates one example of the display media 40. A microcapsule or cell 42, filled with a plurality of metal sol 46 and a clear fluid 44. Metal sol 46 is particles, which are smaller than a wavelength of light. In one detailed embodiment, the metal sol 46 comprises gold sol. When an electric field is applied across the microcapsule or cell 42, sol particles 46 agglomerate and scatter light. When the applied electric field is reduced to below a certain level, Brownian motion causes the sol particles 46 to redistribute, and the display media 40 appears clear from the clear fluid 44.

One of the benefits of using printing methods to fabricate displays is eliminating the need for vacuum-sputtered ITO by using coatable conductive materials. The replacement of vacuum-sputtered ITO with a printed conductive coating is beneficial in several ways. The printed conductor can be coated thinly, allowing for high optical transmission and low first-surface reflection. For example, total transmission can range from about 80% to about 95%. In addition, the printed conductive coating is significantly less expensive than vacuum-sputtered ITO. Another advantage of the encapsulated electrophoretic display medium is that relatively poor conductors can be used as lead lines to address a display element.

The flexible, inexpensive display described above is useful in numerous applications. For example, these flexible displays can be used in applications where paper is currently the display medium of choice. Alternatively, the displays can be made into disposable displays. The displays can be tightly rolled or bent double. In other embodiments, the displays can be placed onto or incorporated into highly flexible plastic substrates, fabric, or paper. Since the displays can be rolled and bent without sustaining damage, they form large-area displays that are highly portable. Since these displays can be printed on plastics they can be lightweight. In addition, the printable, encapsulated electrophoretic display can maintain the other desirable features of electrophoretic displays, including high reflectance, bistability, and low power consumption.

One alternative to E-ink's electrophoretic display is a gyricon display. Gyricon displays are based on a different principal, namely the use of sphere having two different colored hemispheres, such as a white side and a dark side. Xerox has largely developed this technology, as demonstrated by its U.S. Pat. No. 5,808,783. In the '783 patent a gyricon or twisting-ball display is disclosed having reflectance characteristics comparing favorably with those of white paper. The display is based on a material made up of optically anisotropic particles, such as bichromal balls, disposed in a substrate having a surface. The particles situated closest to the substrate surface form substantially a single layer. Each particle in the layer has a center point, no particle in the layer being disposed entirely behind the center point of any nearest neighboring particle in the layer with respect to the substrate surface. Each particle in the layer has a projected area with respect to the substrate surface. Particles of the set are sufficiently closely packed with respect to one another in the layer that the union of their projected areas exceeds two-thirds of the area of the substrate surface. A rotatable disposition of each particle is achievable while the particle is thus disposed in the substrate; for example, the particles can already be rotatable in the substrate, or can be rendered rotatable in the substrate by a nondestructive operation. In particular, the particles can be situated in an elastomer substrate that is expanded by application of a fluid thereto so as to render the particles rotatable therein. A particle, when in its rotatable disposition, is not attached to the substrate. A reflective-mode display apparatus can be constructed from a piece of the material together with a mechanism (e.g., addressing electrodes) for facilitating rotation of at least one of the particles.

FIG. 2C provides a more detailed side view of a gyricon display 50 of the invention in a specific embodiment. In display 50, bichromal balls 52 are placed as close to one another as possible in a monolayer in elastomer substrate 54. Substrate 54 is swelled by a dielectric fluid (not shown) creating cavities 56 in which the balls 52 are free to rotate. The cavities 56 are made as small as possible with respect to balls 52, so that the balls nearly fill the cavities. Also, cavities 52 are placed as close to one another as possible, so that the cavity walls are as thin as possible. Preferably, balls 52 are of uniform diameter and situated at a uniform distance from upper surface 58.

Balls 52 are electrically dipolar in the presence of the dielectric fluid and so are subject to rotation upon application of an electric field, as by matrix-addressable electrodes 60, 62. The electrode 60 closest to upper surface 58 is preferably transparent. An observer sees an image formed by the black and white pattern of the balls 52 as rotated to expose their black or white hemispheres to the upper surface 58 of substrate 54

A monolayer gyricon display according to the invention has advantages in addition to improved reflectance. The operating voltage needed for such a display is less than the voltage needed for a conventional thick gyricon display. This is because the rotation of gyricon balls under the influence of an electric field depends on the field strength. Electric field is the derivative of voltage with respect to distance (for example, in the simple case of a parallel plate capacitor, $E=V/d$). Thus a given electric field strength can be achieved with a lower applied voltage, other things being equal, by reducing the distance over which the voltage is applied. Accordingly, by using the thinnest configuration possible, the operating voltage of the gyricon display is minimized. A lower operating voltage has many advantages, including lower power consumption, less expensive drive electronics, and increased user safety.

Despite the promise of e-ink and gyricon displays, neither technology has achieved any level of commercial implementation. A need exists for translating these technologies into useful displays in the field of watches.

SUMMARY OF THE INVENTION

The present invention addresses many of the shortcomings of the prior art watch technology. Specifically, a watch that embodies the present invention is highly flexible and uses addressable reflective display technology such as electronic ink or gyricons. This allows a watch display that can be flexible. Further, the display can be shaped into a variety of interesting and novel designs that cannot be accomplished using prior art displays.

The flexibility of the display also allows for the novel placement of the watch display. For example, the display can be placed onto a shoe, allowing a runner to see the time without having to move his arm into a viewing position. The watch display could also be placed into a wallet, or on a purse or belt. Any flexible garment or accessory could now incorporate a watch. The patent discloses enclosures to provide for a flexible product, but limit flexibility to prevent damage to the display in usage.

The use of an electrophoretic display or gyricon display is also aided by new sealing technologies that allow the display to be incorporated into high wear, high flex items.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 8A to 8D illustrates a flexible, and reflective watch display incorporated into a watch that has a band made of a material having a memory;

FIGS. 9A to 9F illustrate the various shapes that a flexible and reflective display could take when incorporated into a watch;

FIG. 10 illustrates a sectional view across the watch showing the first and second substrates and the electrophoretic elements therebetween;

DETAILED DESCRIPTION OF THE DRAWINGS

Figure 1A:
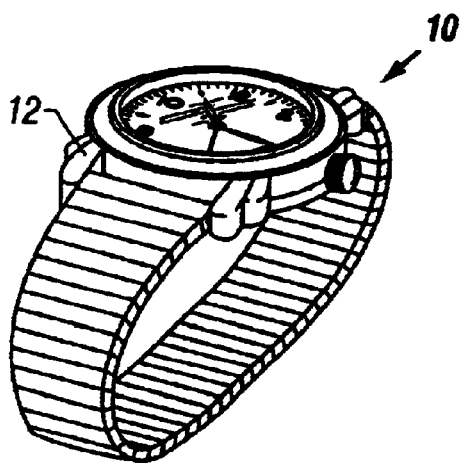
FIG. 1A is a mechanical watch with an analog display.
Figure 1B:
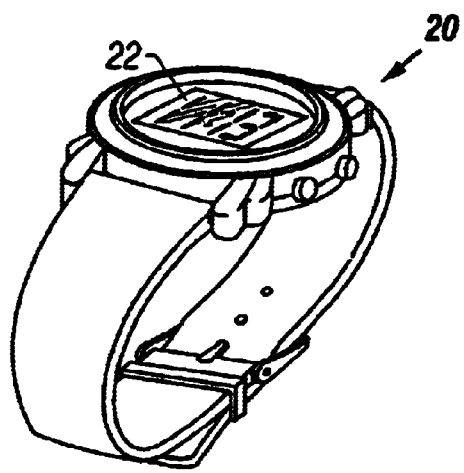
FIG. 1B is a digital watch with a digital display.
Figure 2A:
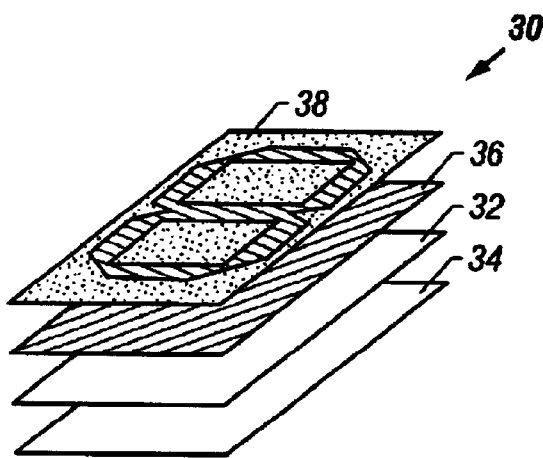
FIGS. 2A and 2B illustrate an example of an electronic ink display.
Figure 2B:
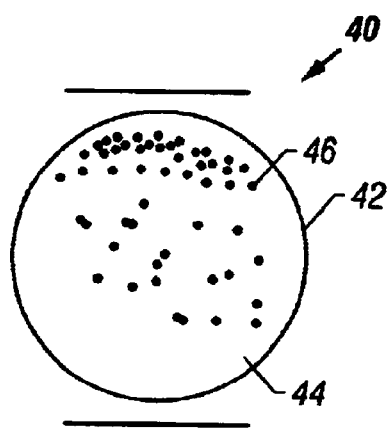
Figure 2C:
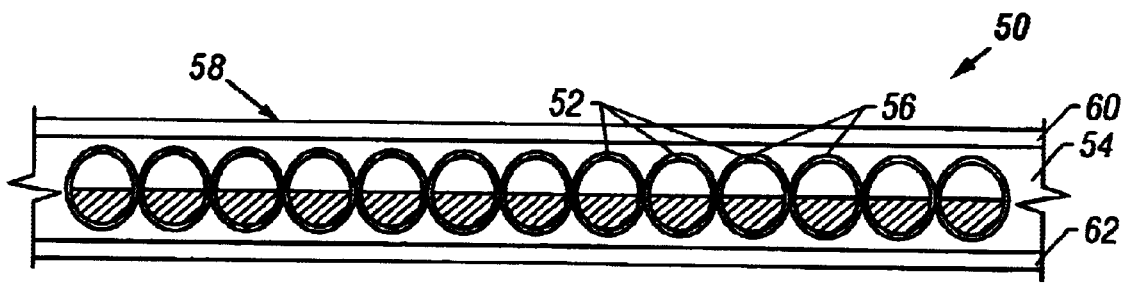
FIG. 2C illustrates a gyricon display.
Figure 3:
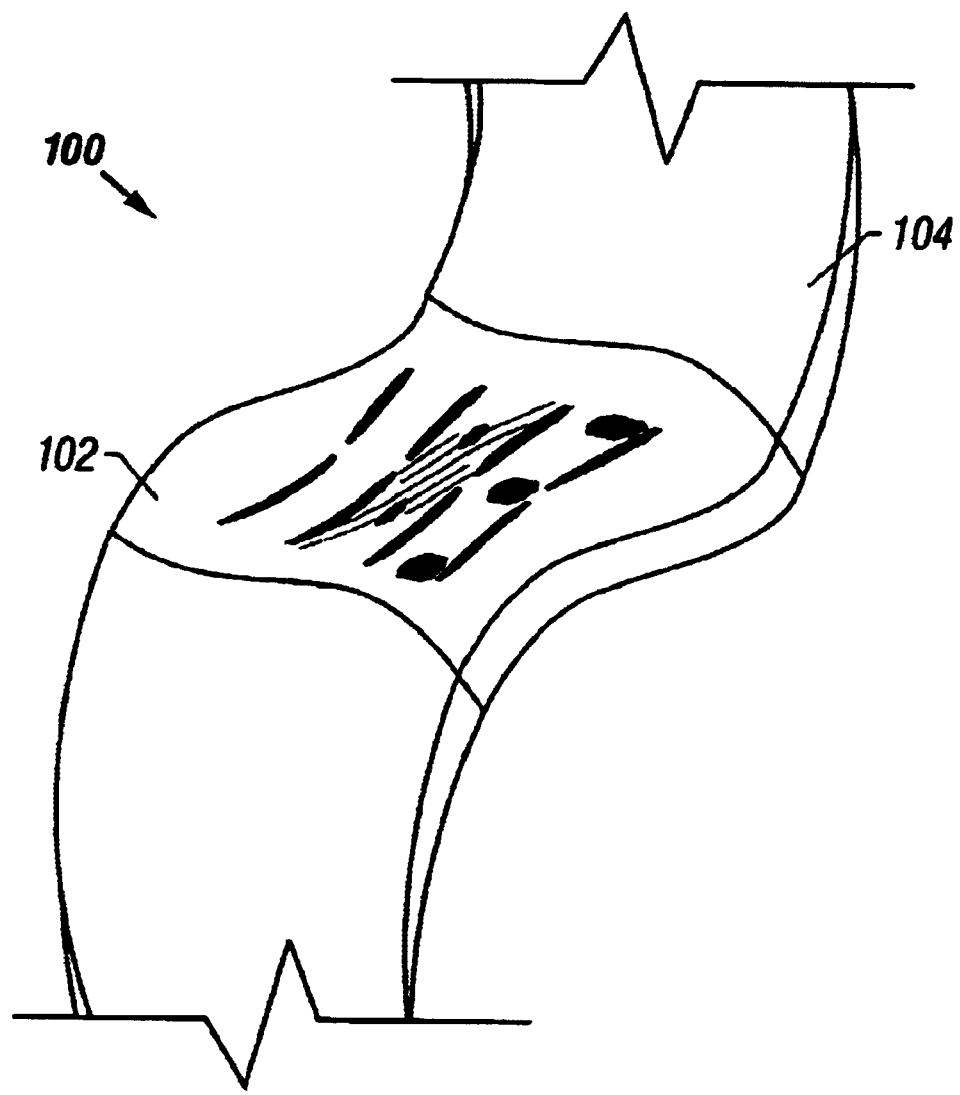
FIG. 3 illustrates a flexible watch display that embodies the present invention.

FIG. 3 is one embodiment of the present invention, namely a thin and flexible watch 100. This flexibility is created through the use of an electrophoretic display such as a electronic ink or a gyricon display. The display 102 can have a plurality of addressable segments shaped to allow the formation of letters, numbers and other shapes. For example, as illustrated, the segments can be shaped to show the time. A timer unit coupled to the display tracks the time and generates a signal that is then translated into the addresses of the segments to be biased. A conductive matrix layer receives this signal and biases the display accordingly, in this case to show the time 11:13. A band 104 can be incorporated to allow the watch 100 to be worn around the user's wrist.

Figure 4:
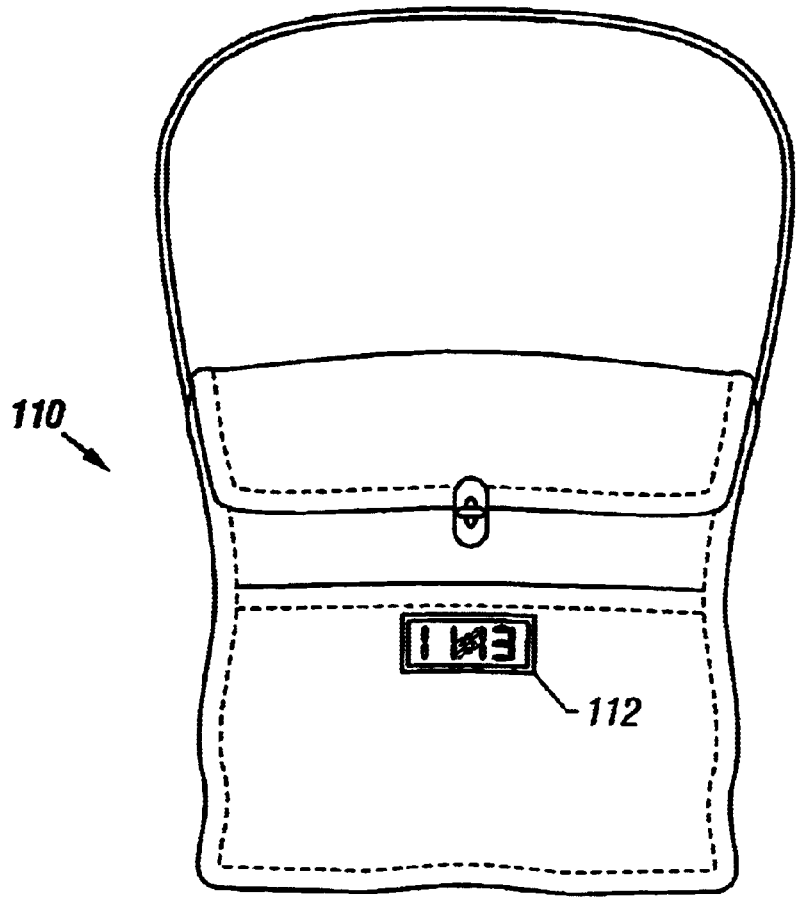
FIG. 4 illustrates a flexible, and reflective watch display incorporated into a purse.
Figure 5:
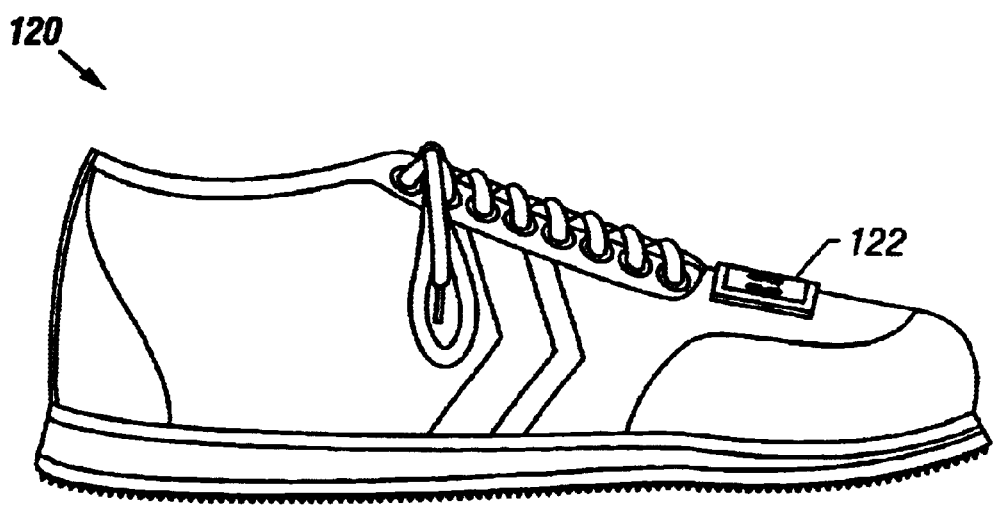
FIG. 5 illustrates a flexible, and reflective watch display incorporated into a shoe.
Figure 6:
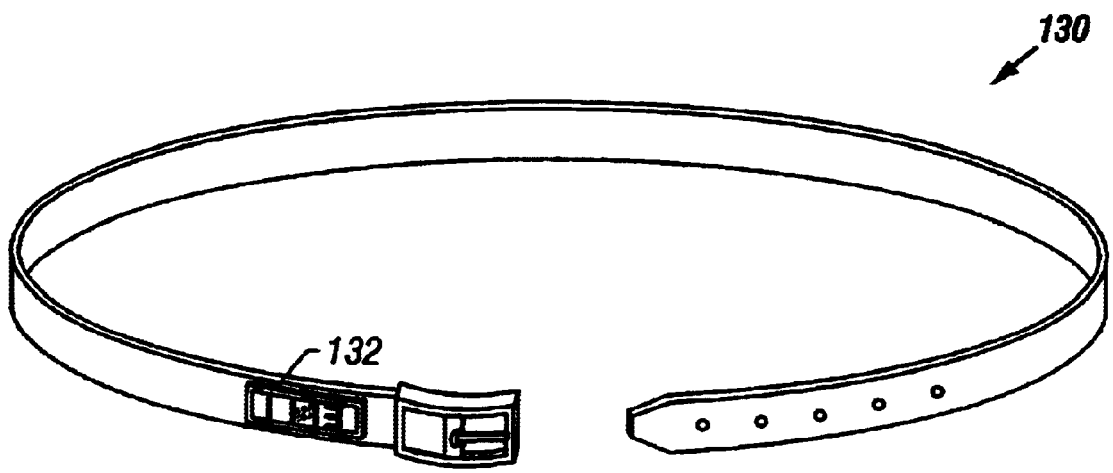
FIG. 6 illustrates a flexible, and reflective watch display incorporated into a belt.
Figure 7:
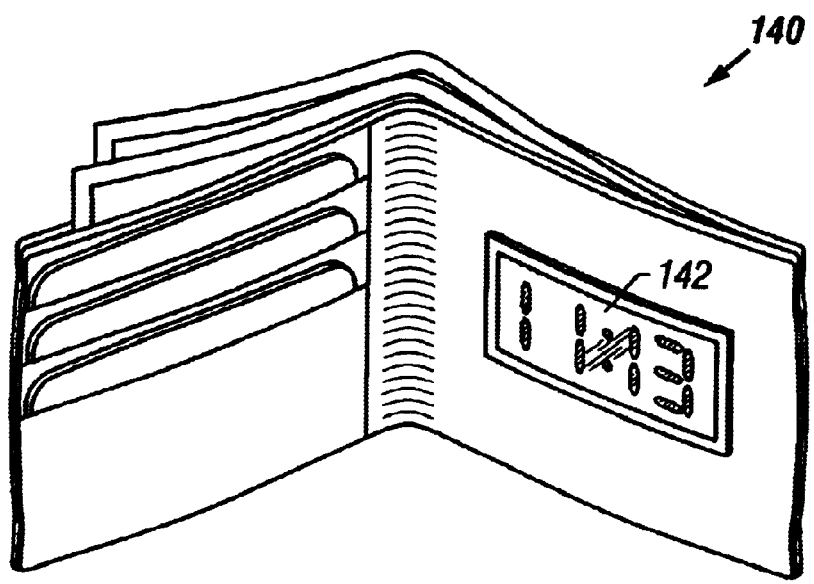
FIG. 7 illustrates a flexible, and reflective watch display incorporated into a wallet.

The flexibility of the electrophoretic display allows the placement of the watch in a variety of environments. Such a watch can be placed in any garment or accessory because of its ability to flex with the garment or accessory. For example, FIG. 4 shows the watch 112 incorporated into the sidewall of a purse 110. FIG. 5 shows a shoe 120 with a watch 122 on an upper surface. FIG. 6 shows a belt 130 with a watch 132 located near the buckle. Likewise, FIG. 7 shows a watch 142 incorporated into a wallet 140. Water resistance is critical issue with any proposed timepiece or watch product. Using the various sealed module techniques discussed below should provide approximately 3 atmospheres (ATM) water resistance. One atmosphere is defined as the pressure of the atmosphere at sea level, which by definition exactly 101.325 Pa. Water resistance is defined as the depth or water pressure that watchcase is capable of withstanding before leakage of water into the watch. Since water pressure is much higher than air pressure, one ATM is approximately equivalent to 10 meters under water, and 3 ATM would therefore we equivalent to 30 meters. For many products it is often desired to have at least 5–10 ATM so that users may even swim in it. To achieve these higher ATM levels, there may be significant additional pressures on the internal components, including battery, electronics, and display material, since in some of these watch applications the external structure is a soft plastic.

One embodiment of watch incorporating an electrophoretic display is shown in FIGS. 8A to 8D. The watch 200 has a band 202 with no buckle or fastener. Instead the band incorporates a strip 210 having a memory. Thus, when a user slaps the watch onto his wrist, it will go from a flat configuration as shown in FIG. 8C to a curved configuration as shown in FIG. 8D. A circuit board with microcontroller timer 206 is located within the band 202. Also, a battery 208 can be incorporated within the band 202. The timer includes a means for maintaining a time and date as well as a means for addressing a conductive matrix within the splay 204. While a battery is shown, any appropriate power source could be used. For example, a flexible solar cell could be substituted for the battery. The necessary voltage could even be generated by the physical flexing of a band or by the heat from the user's body.

In one embodiment, a metal or plastic support can be directly co-molded to the display material or as part of the module containing the material. The metal or plastic will be one that has memory, which limits the amount of flexing the complete product/module will be able to be bent, or in fact prevent material from bending in certain directions. To avoid excessive flex of the display, stoppers or supports can be strategically placed within module or watch construction. Too much flexing of the display may decrease the adhesive strength of the seals resulting in damage to the display technology and ultimately to the watch or timepiece module itself. Also the conductive medium sometimes utilized in these reflective display technologies consists of a transparent conductive metal, commonly known as Indium-Tin Oxide (ITO). Although coated at thickness of micrometer or angstroms this thin layer still has brittle properties of metals, and can crack and break under repeated flexing. This is another reason why certain measures may need to be employed in the production and design of the watch or timepiece module to limit or restrain the amount of flexing the module, and ultimately the display, will be susceptible to during the life of the product.

The display 204 can be connected by a flexible membrane connector to a flexible PCB that has the MCU and driving electronics. To maximize thinness of overall watch this flexible membrane could be located parallel to the plane of the display, which differs from conventional LCD solutions which are inevitably placed behind glass display since they are already limited by rigid display. The area between display 204 and timer 206 could be a flexible conductive material or a heat seal connector.

Figure 9A:
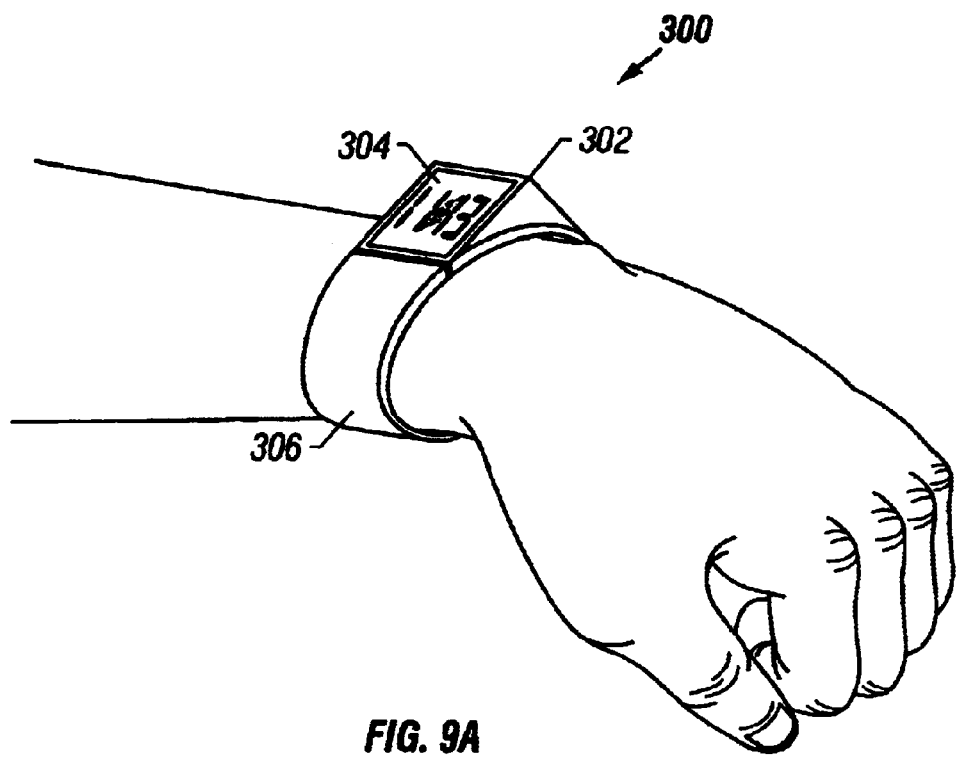
Figure 9B:
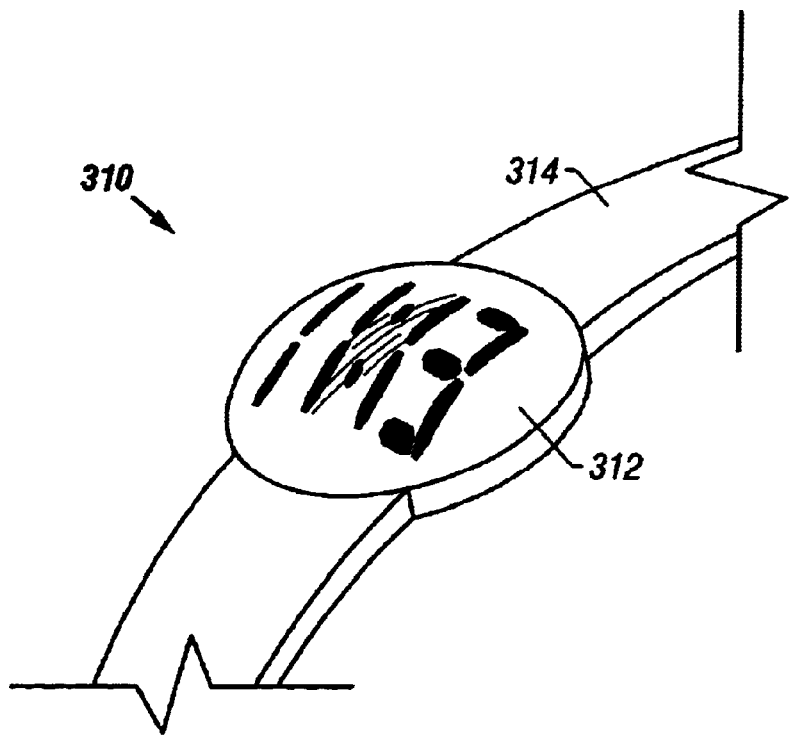
Figures 9C, 9D:
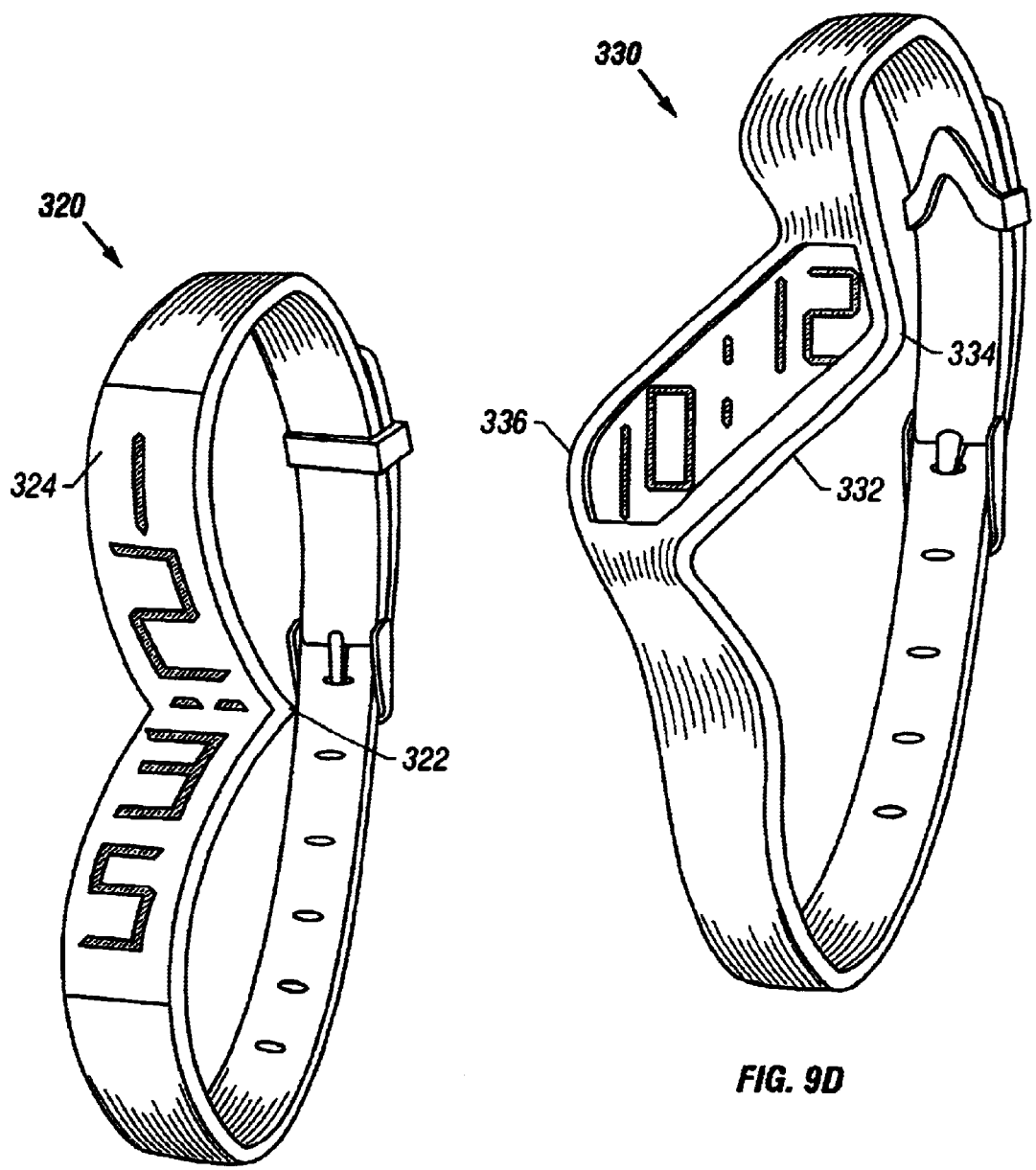

The flexibility of an electrophoretic display provides the ability to be creative in the shape of the display. For example, FIG. 9A shows a watch 300 having a display 304 with a central ridge 302. This allows a user to see the time without having to rotate his arm. The time is shown on one portion of the display, however, the other side could show a date or other information. A band 306 helps position the watch on the user's wrist. In another embodiment of the present invention, the display can be shaped with a hemispherical curve. FIG. 9B shows a watch 310 with a curved display 312 and a band 314.

FIGS. 9C to 9F illustrate other interesting designs for watches 320, 330, 340, and 350. Watch 320 has a central ridge 322 that creates two curved portions to the display 324. Watch 330 offers a laterally slanted display 332 with a first and second inflection point 334, 336. Watch 340 has a taper that brings the display from a wider portion 344 to a thinner portion 342. Finally, watch 350 could have a display 352 that stretches across the entire upper surface of a user's wrist. The irregularity shaped display can incorporate a first and a second radius of curvature.

A sectional view across an electrophoretic display is shown in FIG. 10. Because of the characteristic of these display technologies there typically can be damage over temperatures of 120 degrees Celsius. Therefore to incorporate these displays into an integrated module, high frequency (ultrasonic) bonding method of plastics to bond two pieces of polyurethane 402, 404 to encapsulate the display elements 410, printed circuit board 406 and conductive matrix 408. The bonding method should only affect the sealed edges 412, so that heat generated during bonding should not affect the display 410. This compares to the conventional insert mold process, where heat inside the mold can be as high as 300 degree C. or up resulting in immediate damage to the adhesive seals of the flexible display while inside the mold's cavity. The advantage of this method is that the display can be placed in a watertight enclosure.

One of the more popular lighting solutions currently employed in watches is electroluninscent (EL). This was pioneered to some degree by TIMEX in the early 1990's with their INDIGLO® EL backlighting solution. Today nearly every LCD digital watch features an EL backlight, along with many conventional analog watches with typical watch dials. Lighting has become major necessity as a key feature of watches or timepieces today. Unlike an LCD, the high reflective display technologies outlined in this patent application are reflective and any backlighting solution will not be effective. One possible solution is to use LED 414 strategically placed within the enclosure. These LEDs would ideally be situated to provide uniform lighting of the display area. Because they are relatively small they would not add to the module thickness nor be affected when the watch is flexed.

Figure 11A:
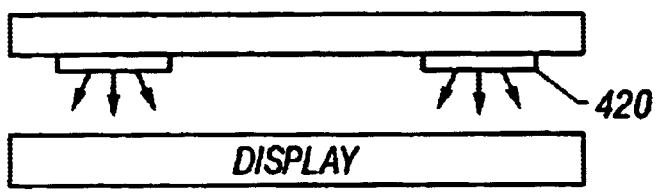
FIGS. 11A to 11D illustrates various front lighting and color filter techniques.
Figure 11B:
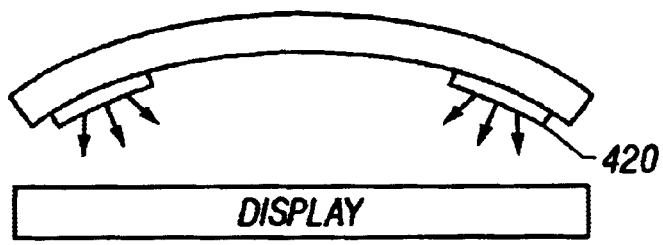
Figure 11C:
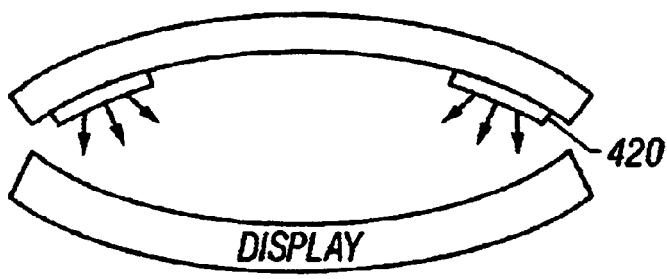

Another viable solution would involve using an EL frontlighting solution. In this application an EL material would be situated at the periphery of the visible display. The effectiveness of the front lighting source is dependent on its position and shape of the display and the structure holding the light source. Lighting around the periphery of a larger display can be inadequate to properly illuminate the center of the display. FIGS. 11A to 11C illustrate several options for lighting a reflective display. In FIG. 11A, the light source is located around the periphery of the display. The light source 420 could be attached to the top of the inside of the module enclosure and shine directly down on the reflective display material. Another embodiment would involve utilizing a more flexible light source, possible as that sold as ELASTOLITE by ELSPECIALISTS. The light source could be placed in the area between the top of the reflective display and top of module enclosure. The flexible light source 420 could be curved, as shown in FIG. 11B rather than simply attached to the top of the enclosure and projecting the light downward. In this curved orientation more of the light would be projected towards the center of the reflective display that it is illuminating to provide more uniform lighting.

Another solution would involve the EL or LED lighting elements placed at the periphery of the display. Placing slight negative curvature of the reflective display, as shown in FIG. 11C would allow light to more uniformly light the center as well as the side of the display. This is only a solution that could be done using the highly reflective display solution identified in this patent.

Figure 11D:
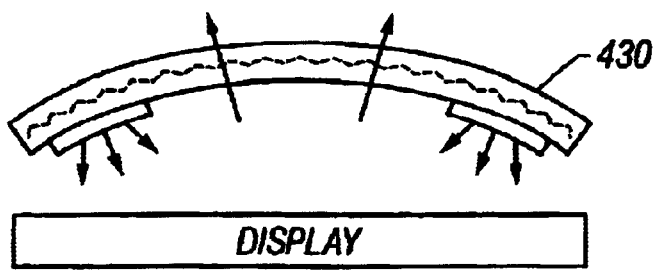

Color filters have often been applied in numerous products, including the watch industry. In most of these applications, due to the lower transmittance or reflectance of the LCD the color is very muted and gray whether the LCD segment is on or off. Clearly color is important feature of many commercial products, in using a high reflectance display technology as outlined in this patent application in a watch provides also the ability to place color filters over the display area. This means that taking a typically monochromic display featuring only white on black the white reflectance is 2x–3x more reflective than a conventional LCD. A carefully selected color filter 430, as shown in FIG. 11D, could therefore product the effect of color segments when the display is in a "on" state and black segments when the display is in "off" state or vice versa. A filter 430 could be attached to the display 400 in the enclosure, or placed above it within the enclosure (as shown), or the color could be incorporated into the enclosure itself.

Figure 12:
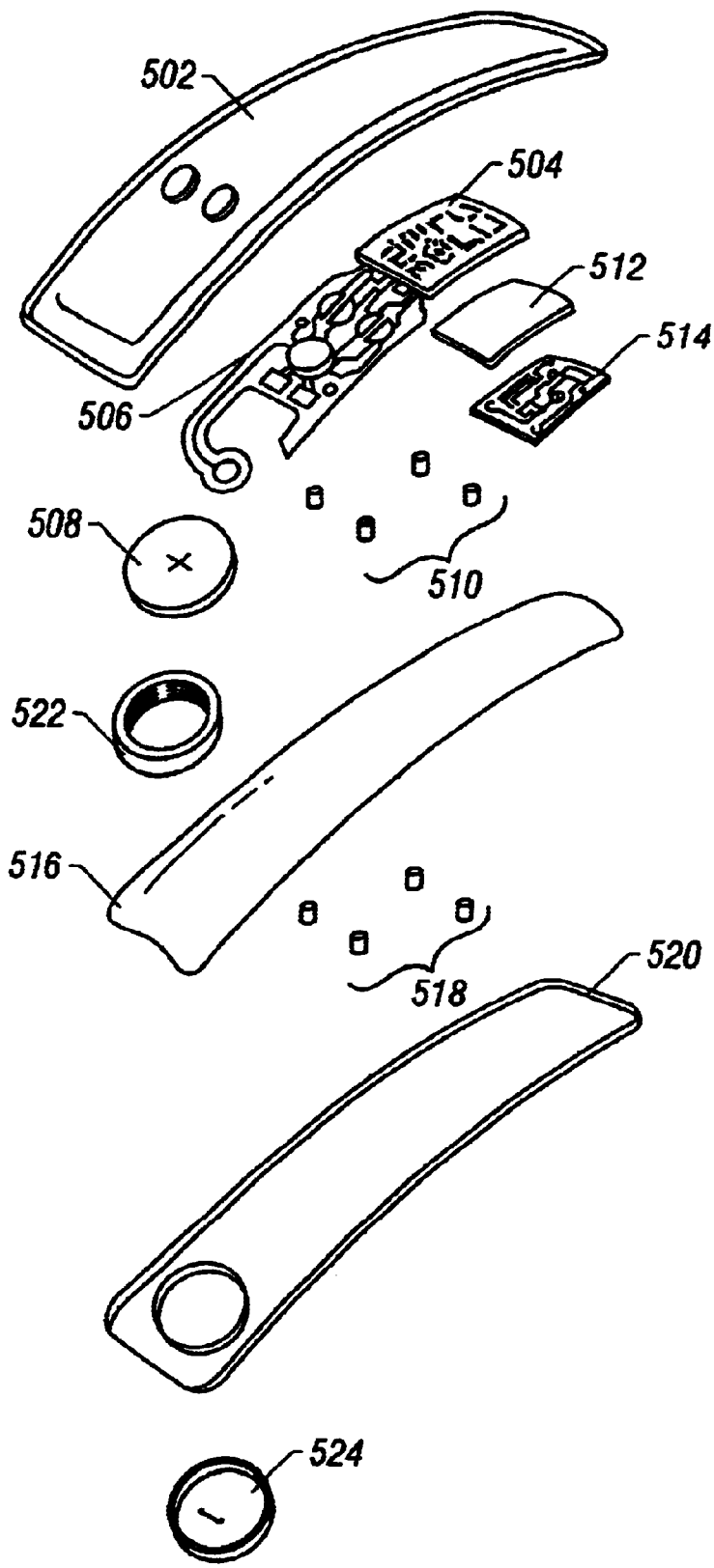
FIG. 12 is an exploded view of a timepiece that embodies the present invention that utilizes flex limiters.

As alluded to above, there is a need to avoid over flexing the display. Overflex can cause damage to the display and render it inoperable. FIG. 12 is an exploded view of a timepiece having a flexible display. The watch 500 has a two-piece band with an upper band 502 and a lower band 520. A memory metal sheet 516 can be enveloped between the bands 502, 520. Of course, the memory metal sheet is only used in one embodiment and could be eliminated. The display 504 and attendant electronics 506, 512, 514 are also located within the upper and lower bands. A battery 508 provides power and is held in place by a holder 522 and a cover pad 524. However, note the placement of flex limiters 510, 518. These plastic stoppers can be strategically placed adjacent the display 504 to ensure that the bands 502, 520 are less flexible in the immediate vicinity of the display 504.

The term flex limiter is used to mean any device or treatment that limits the amount or direction of flex experienced by the display. It can also mean any device that could be used to limit the number of flex duty cycles experienced by the display while in use. The use of plastic stoppers is only one embodiment for a flex inhibitor. Other solutions could include the placement of a stiff metal or plastic strip adjacent to the display. The flex limiter could be a hard module that encases the timer and the display. Alternatively, it could be a support located between the display and a lower module portion or between the display and an upper module portion. The flex limiter could also be located outside of the module encasing the display. The flex limiter could also simply be the plastic or metal construction materials of the module itself that have an inherent limitation on flexibility.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A wrist-worn timepiece comprising:
   (a) a display mechanism comprised of a timer connected to a flexible and reflective display unit, wherein said display unit includes a display media comprised of a plurality of encapsulated display elements; and
   (b) at least one flex limiter located adjacent to the display unit; wherein said display mechanism and flex limiter are encased within a flexible watertight watchband comprised of a transparent upper portion bonded to a lower portion.

2. The wrist-worn timepiece of claim 1 wherein said flex limiter is a support located between the display unit and the lower portion.

3. The wrist-worn timepiece of claim 1 wherein said flex limiter is a support located between the display unit and the upper portion.

4. The wrist-worn timepiece of claim 1 wherein said flex limiter comprises a memory strip having a first and second configuration located between the display unit and the lower portion.

5. The wrist-worn timepiece of claim 1 further comprising:
   (d) a light source adjacent to the display unit.

6. The wrist-worn timepiece of claim 5 wherein said light source is a light emitting diode.

7. The wrist-worn timepiece of claim 5 wherein said light source is an electro-luminescent lamp.

8. The wrist-worn timepiece of claim 1 wherein the display unit comprises an electrophoretic display.

9. The wrist-worn timepiece of claim 1 wherein the display unit comprises a gyricon display.

10. The wrist-worn timepiece of claim 1 wherein the display unit comprises:
    (a) a first substrate;
    (b) the display media deposited on said substrate; and
    (c) a conductive matrix in contact with the display media, wherein said conductive matrix is addressable.

11. The wrist-worn timepiece of claim 1 wherein the timer comprises a circuit on a flexible printed circuit board.

12. The wrist-worn timepiece of claim 1 wherein the upper and lower portions are bonded ultrasonically.

13. The wrist-worn timepiece of claim 12 wherein the upper and lower portions are bonded only along their adjoining edges.

14. The wrist-worn timepiece of claim 13 wherein said upper and lower portions are comprised of polyurethane (PU), polyester, polycarbonate (PVC), or cautchouc (pure form of rubber).

15. The wrist-worn timepiece of claim 1 further comprising a voltage source.

16. The wrist-worn timepiece of claim 15 wherein the voltage source is a battery.

17. The wrist-worn timepiece of claim 15 wherein the voltage source is a solar cell.

18. The wrist-worn timepiece of claim 1 wherein said display unit is monochromatic.

19. The wrist-worn timepiece of claim 1 wherein said display unit is polychromatic.

20. The wrist-worn timepiece of claim 1 further comprising a color filter adjacent to said display unit.

21. The wrist-worn timepiece of claim 1 wherein said display unit has an irregular shape.

22. The wrist-worn timepiece of claim 21 wherein said irregular shape incorporates more than one radius of curvature.

23. A fashion accessory comprising:
    a timepiece module, integrated into the accessory, and comprised of
    (a) a display mechanism which includes a timer connected to a flexible and reflective display unit, wherein said display unit includes a display media comprised of a plurality of encapsulated display elements;
    (c) at least one flex limiter located adjacent to the display; and
    (d) a flexible watertight module comprised of a transparent upper portion and a lower portion that encases said display mechanism and flex limiter, wherein said upper and lower portions are ultrasonically bonded to one another along their adjoining edges.

24. The accessory of claim 23 wherein the accessory is a purse.

25. The accessory of claim 23 wherein the accessory is a belt.

26. The accessory of claim 23 wherein the accessory is a wallet.

27. The accessory of claim 23 wherein the accessory is a shoe.

28. A timepiece module comprising:
    (a) a reflective d splay which includes a flexible substrate having deposited thereon a display media comprised of a plurality of encapsulated display elements;
    (b) a timer coupled to the display;
    (c) at least one flex limiter located adjacent to the display;
    (d) a light source adjacent to the display; and
    (e) a flexible watertight module comprised of an upper portion and a lower portion that encases said display, light source, and flex limiter, wherein said upper and lower portions are ultrasonically bonded to one another along their adjoining edges an said upper portion includes a transparent section positioned over the reflective display.

29. The timepiece module of claim 28 wherein said reflective display comprises an electrophoretic display.

30. The timepiece module of claim 29 wherein said reflective display comprises a gyricon display.

31. The timepiece module of claim 29 wherein said light source is located around the periphery of the display.

32. The timepiece module of claim 31 wherein said light source is coupled to the transparent section of the upper portion of the casing.

33. The timepiece module of claim 32 wherein the transparent section of the upper portion of the casing is curved.

34. The timepiece module of claim 32 wherein said light source is curved.

35. The timepiece module of claim 32 wherein said display is curved.

36. The timepiece module of claim 32 wherein said light source is an electro-luminescent lamp.

37. The timepiece module of claim 32 wherein the light source is an LED.

38. The timepiece module of claim 28 further comprising a translucent substrate layer positioned between the display and the upper portion, wherein the light source is coupled to said substrate layer.

39. The timepiece module of claim 38 wherein the substrate layer is curved.

40. The timepiece module of claim 38 wherein the light source is curved.

41. The timepiece module of claim 38 wherein said display is curved.

42. The timepiece module of claim 38 wherein the light source is an electro-luminescent lamp.

43. The timepiece module of claim 38 wherein the light source is located around the periphery of the display.

44. The timepiece module of claim 38 wherein the translucent substrate layer is a color filter.

45. A method for manufacturing a timepiece having a flexible display mechanism comprised of a plurality of encapsulated display elements comprising:

(a) aligning said display mechanism adjacent to at least one flex limiter to form an insert unit;

(b) positioning said insert unit between a first and second module portion; and (c) ultrasonically bonding said first module portion to said second module portion along their adjoining edges.

46. The method for manufacturing a timepiece of claim 43 wherein the flex limiter comprises a memory strip having a first and second configuration.

47. The method for manufacturing a timepiece of claim 43 wherein the display mechanism comprises a timer connected to a reflective display unit.

48. The method for manufacturing a timepiece of claim 47 wherein the insert unit further comprises a light source positioned adjacent to the display unit.

49. The method for manufacturing a timepiece of claim 48 wherein the light source is a light emitting diode.

50. The method for manufacturing a timepiece of claim 48 wherein the light source is an electro-luminescent lamp.

51. The method for manufacturing a timepiece of claim 47 wherein the display unit comprises an electrophoretic display.

52. The method for manufacturing a timepiece of claim 47 wherein the display unit comprises an gyricon display.

53. The method for manufacturing a timepiece of claim 47 wherein the display unit comprises:

(a) a first substrate;

(b) the display media deposited on said substrate; and (c) a conductive matrix in contact with the display media, wherein said conductive matrix is addressable.

54. The method for manufacturing a timepiece of claim 47 wherein the display unit is monochromatic.

55. The method for manufacturing a timepiece of claim 47 wherein the display unit is polychromatic.

56. The method for manufacturing a timepiece of claim 47 wherein the insert unit further comprises a color filter positioned adjacent to the display unit.

* * * * *

UNITED STATES PATENT AND TRADEMARK OFFICE
CERTIFICATE OF CORRECTION

PATENT NO.    : 6,621,766 B2
DATED         : September 16, 2003
INVENTOR(S)   : Donald R. Brewer et al.

It is certified that error appears in the above-identified patent and that said Letters Patent is hereby corrected as shown below:

Column 6,
Line 34, after "matrix within the", please change "splay" to -- display --;

Column 9,
Line 34, please change "(d)" to -- (c) --;

Column 10,
Line 18, please change "(c)" to -- (b) --;
Line 20, please change "(d)" to -- (c) --;
Line 34, after "a reflective", please change "d splay" to -- display --;
Line 40, after "a flexible watertight", please change "module" to -- casing --.

Signed and Sealed this

Fifteenth Day of March, 2005

JON W. DUDAS
*Director of the United States Patent and Trademark Office*